United States Patent [19]
Greene

[11] Patent Number: 5,619,815
[45] Date of Patent: Apr. 15, 1997

[54] POG HOLDER AND METHOD

[76] Inventor: Dennis Greene, 2211 S. Grand Ave., Santa Ana, Calif. 92705

[21] Appl. No.: 385,111

[22] Filed: Feb. 6, 1995

[51] Int. Cl.$^6$ .................................................. G02B 5/12
[52] U.S. Cl. ...................... 40/661.05; 40/587; 280/288.4
[58] Field of Search .......................... 40/642, 662, 666, 40/1.5, 1.6, 27.5, 587, 611, 622; 280/288.4

[56] References Cited

U.S. PATENT DOCUMENTS

| | | | |
|---|---|---|---|
| 2,340,402 | 2/1944 | Mitchell | 40/1.5 |
| 2,830,394 | 4/1958 | Gordon et al. | 40/692 |

FOREIGN PATENT DOCUMENTS 9315493  8/1993  WIPO ..................................... 40/662

*Primary Examiner*—Kenneth J. Dorner
*Assistant Examiner*—Cassandra Davis
*Attorney, Agent, or Firm*—John J. Connors; Connors & Assoc.

[57] ABSTRACT

A device for holding a POG includes a disk-like, circular base. The base has a front face and a rear face, with the front face having a rim extending at least partially along the perimeter of the base which is adapted to grasp the POG and hold it snug against the front face upon placing the POG within the circumference of the rim. A gripping member on the rear face attaches the base to at least one spoke of, for example, a wheel of a bicycle.

7 Claims, 2 Drawing Sheets

POG HOLDER AND METHOD

BACKGROUND OF THE INVENTION

1. Field of the Invention

This invention relates to a device for holding a POG and method of displaying the device holding the POG by attaching the device to a spoke of a wheel.

2. Background Discussion

POG is a trademark of the American POG Federation and refers to a circular disk having the picture of a celebrity, graphic design, advertisement, or other image, on one face of the disk. These disks orginated as milk bottle caps, and a popular game uses these disks, referred to herein as POG(S), as tokens that are captured by competing players. Many children have large POG collections, and desire to display them. The present invention provides a unique way to mount POGS on the spokes of a wheel.

SUMMARY OF THE INVENTION

The device of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include providing an inexpensive display device for POGS and a simple way to mount this device on spokes of a wheel.

The first feature of the POG holding device of this invention is that it includes a disk-like, circular base. The diameter of the base preferably is slightly greater than the diameter of the POG. Typically, a POG has a diameter of slightly great than 1.5 inch and a thickness slightly great than 1/16 inch. Preferably, the POG holding device is made of a polymeric material and is formed by an injection molding process. Suitable polymeric material is, for example, polyethylene, polypropylene, acetal, or polycarbonate.

The second feature is that the base has a front face and a rear face. There is a rim extending at least partially along the perimeter of the base which is adapted to grasp and hold the POG snug against the front face upon placing the POG within the circumference of the rim. The internal diameter of the rim is slightly less than the diameter of the POG. Thus, the POG may be placed on the front face with the rim snugly holding the POG on the base, displaying the POG.

The third feature is that the rim preferably has a height about equal to the thickness of the POG. Although, if the height of the rim is slightly greater than the thickness of the POG, and the rim is continuous and extends uninterrupted around the perimeter of the base, it provides an extremely good grip on the POG. The height of the rim may be slightly less than the thickness of the POG and the grip is still acceptable.

The fourth feature is that there is a gripping member on the rear face for attaching the base to at least one spoke of a wheel, for example, the spoked wheel of a bicycle and the like. In the preferred embodiment of this invention, the gripping member has at least two pairs of gripping fingers spaced from each other a predetermined distance sufficient to enable the base to be attached between an adjacent pair of spokes, one pair of gripping fingers straddling and grasping one spoke and the other pair of gripping fingers straddling and grasping the other spoke.

This invention also includes a method of displaying a POG on a spoke of a wheel. This method includes the following steps:

(a) providing a device for holding a POG, including
a disk-like, circular base,
said base having a front face and a rear face, with the front face having a rim extending at least partially along the perimeter of the base which is adapted to grasp the POG and hold it snug against the front face upon placing the POG within the circumference of the rim, and
a gripping member on the rear face for attaching the base to at least one spoke, (b) placing a POG in the device within the circumference of the rim, with the rim firmly grasping the POG, and (c) attaching the device to the spoke using the gripping member.

The POG may be placed in the device prior to attaching the device to the spoke, or the POG may be placed in the device after the device has been attached to the spoke.

DESCRIPTION OF THE DRAWING

The preferred embodiments of this invention, illustrating all its features, will now be discussed in detail. These embodiments depict the novel and non-obvious POG holding device and method of this invention as shown in the accompanying drawing, which is for illustrative purposes only. This drawing includes the following figures (FIGS.), with like numerals indicating like parts.

DETAILED DESCRIPTION OF THE PREFERRED EMBODIMENTS

As best illustrated in FIGS. 1 through 4, the POG holding device 10 of this invention includes a disk-like circular base 12 having a diameter slightly greater than the diameter of the POG p. A typical POG p has a diameter of slightly greater than about 1.5 inch and a thickness slightly greater than about 1/16 inch. The outward facing surface x of the POG p ordinarily has an picture or other image printed thereon. The device 10 is made of a polymeric material and is formed by a conventional injection molding process. The preferred polymeric material is polyethylene, polypropylene, acetal, or polycarbonate.

Figure 3:
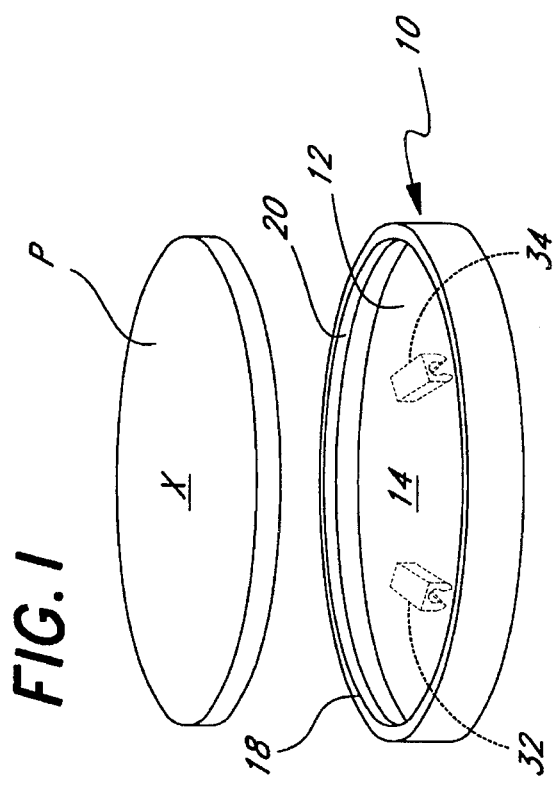
FIG. 3 is a plan view of the rear face of the POG holding device of this invention.
Figure 4:
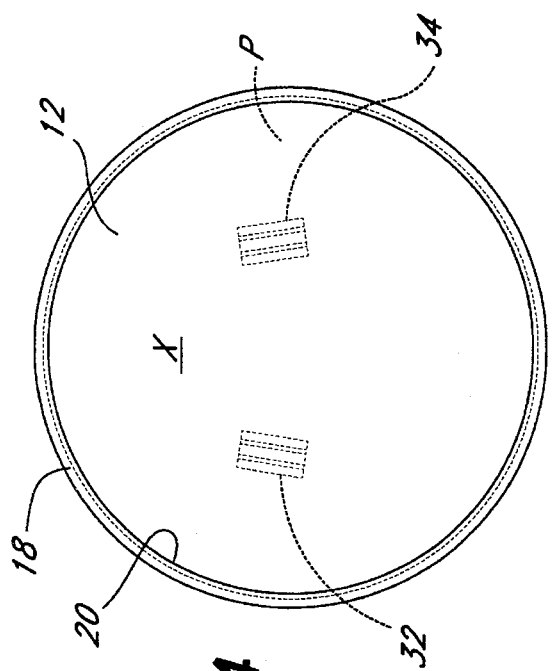
FIG. 4 is a plan view of the front face of the POG holding device of this invention.
Figure 1:
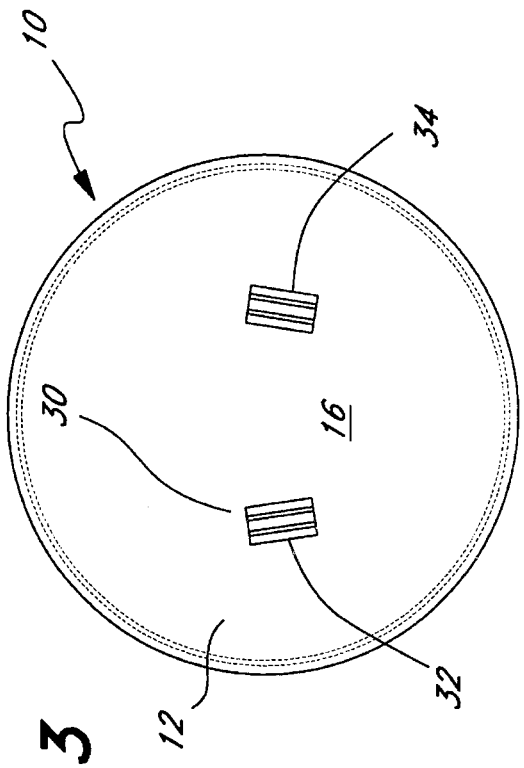
FIG. 1 is a perspective view of the POG holding device of this invention.
Figure 2:
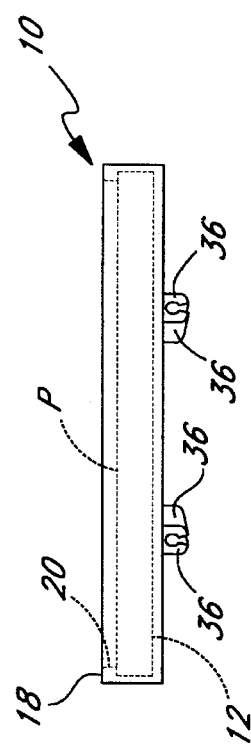
FIG. 2 is a side elevational view of the POG holding device of this invention.

The base 12 has a front face 14 and a rear face 16. The front face 14 has integral with the base 12 a rim 18 extending around the perimeter of the base. Preferably, there is a small internal lip 20 at the top inside edge of the rim 18 which assists in holding the POG p. The rim 18 may be continuous, or it may be discontinuous and comprises a series of spaced apart sections. A continuous rim 18 is preferred. The rim 18 has a height about equal to the thickness of the POG p, preferably slightly higher to provide space for the lip 20 to overlap with the edge of the POG p, as shown in FIG. 2. The internal diameter of the rim 18 is preferably slightly less than the diameter of the POG p. Consequently, the POG p may be placed on the front face 14 and forced within the circumference of the rim 18, with the rim flexing and snugly holding the POG p on the base 12, displaying the POG p.

Figure 7:
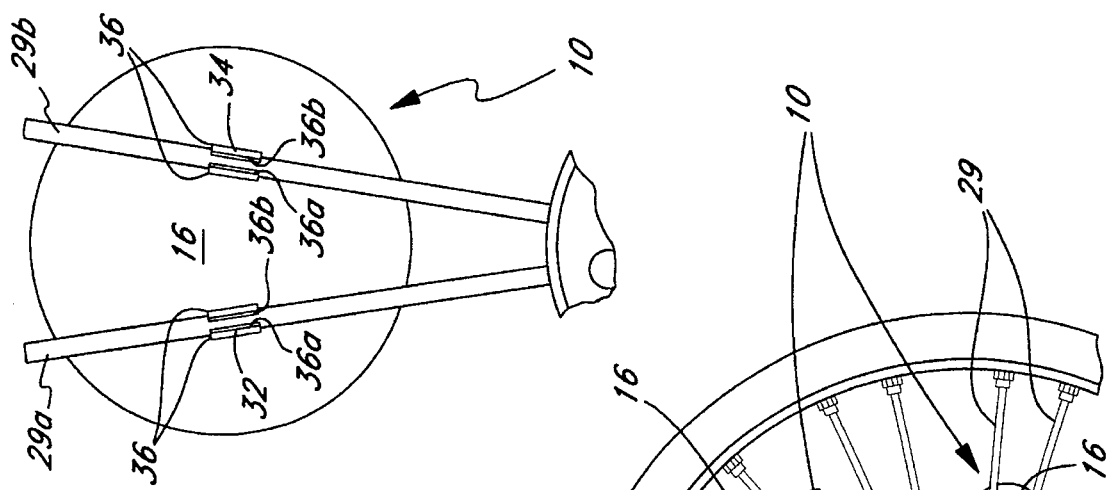
FIG. 7 is an enlarged view showing the preferred way to attach the device of this invention to a pair of adjacent spokes of the wheel shown in FIG. 6.
Figure 6:
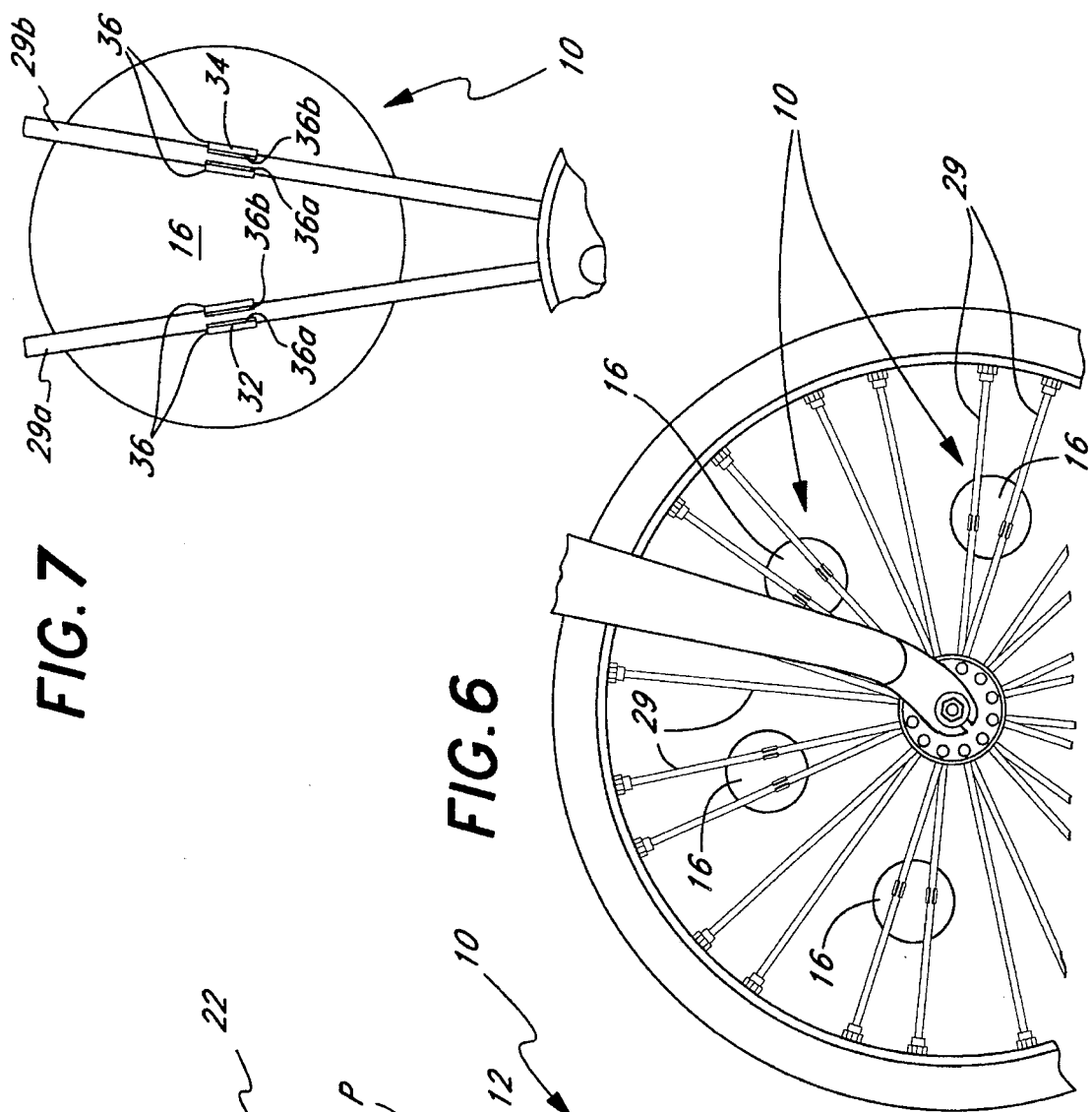
FIG. 6 is a side elevational view of a spoked wheel where several devices of this invention are attached to individual spokes of the wheel.

The device 10 is designed to be removably attached to spokes 29 as depicted in FIGS. 6 and 7. To accomplish this a gripping member 30 is provided on the rear face 16 of the base 12. Preferably, gripping member 30 comprises at least two pairs 32 and 34 of gripping fingers 36. Each pair 32 and 34 of gripping fingers are spaced from each other a predetermined distance sufficient to enable the base 12 to be attached between an adjacent pair of spokes 29a and 29b as illustrated in FIG. 7. One pair 32 of gripping fingers 36 straddles and grasps the one spoke 29a and the other pair 34 of gripping fingers straddles and grasps the other spoke 29b. The tips 36a and 36b of the pairs 32 and 34 of the gripping fingers 36 point inward toward each other to provide greater holding capability.

Figure 5:
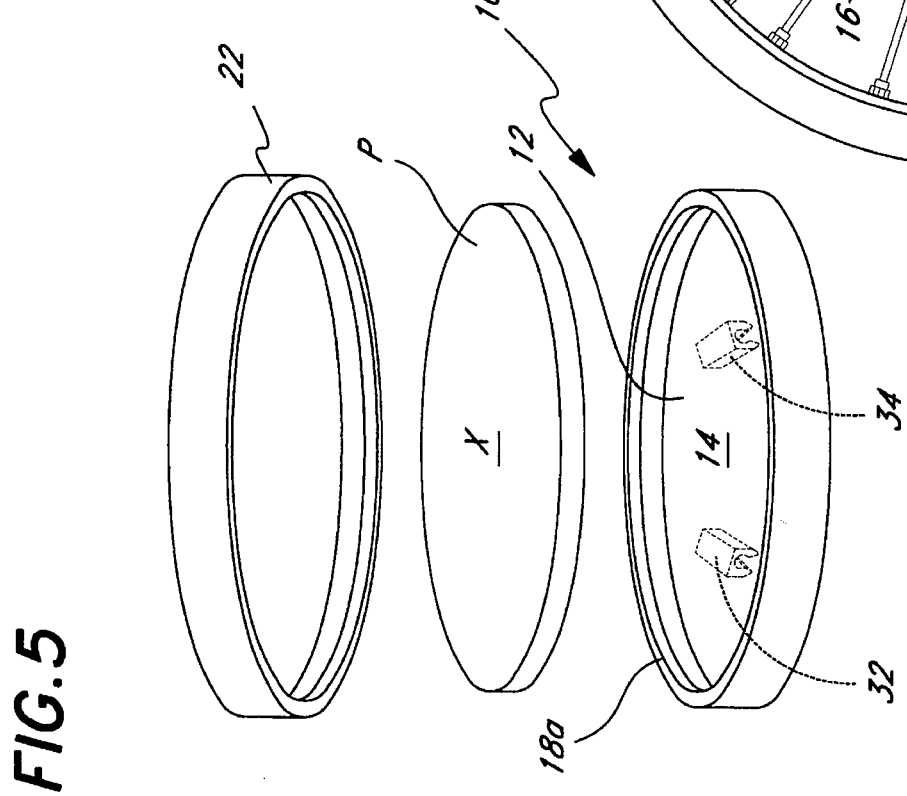
FIG. 5 is a perspective view of an alternate embodiment of the POG holding device of this invention.

In the alternate embodiment shown in FIG. 5, the height of the rim 18a is about equal to the combined thickness of the POG p and a ring 22 which has a diameter slightly greater than the internal diameter of the rim 18a. The ring 22 is snap fitted between the rim 18a and the front face 12 of the base 12, with the POG p between the ring and the front face. The rim 18a does not have a lip 20, but simply expands slightly when the ring 22 is forced to fit within the circumference of the rim. The ring 22 is preferably made of a polymeric material and is formed by a conventional injection molding process. The preferred polymeric material is polyethylene, polypropylene, acetal, or polycarbonate.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

I claim:

1. A device adapted to hold a POG and be attached between adjacent spokes of a wheel, including
   a disk-like, circular base having a diameter slightly greater than about 1.5 inch,
   said base having a front face and a rear face, with the front face having a rim extending at least partially along the perimeter of the base, and rim having a height of slightly greater than about 1/16 inch and a lip extending along the interior of the rim, whereby the POG may be placed on the front face with the rim snugly holding the POG on the base, displaying the POG, and
   at least two spaced gripper on the rear face, each gripper having a pair of fingers cooperating with one another to define a slot having a longitudinally axis, so that the axes of the slots are spaced from each other a predetermined distance and positioned at a predetermined angle to one another sufficient to enable the base to be attached between said adjacent pair of spokes,
   the fingers of each pair of gripper are adapted to straddle and grasp one spoke of said adjacent pair of spokes.

2. The device of claim 1 being formed by a molding process from a polymeric material.

3. The device of claim 2 where the polymeric material is selected from the group consisting of polyethylene, polypropylene, acetal, and polycarbonate.

4. A method of displaying a POG on a spoke, including the steps of
   (a) providing a device for holding a POG, including
      a disk-like, circular base,
      said base having a front face and a rear face, with the front face having a rim extending at least partially along the perimeter of the base which is adapted to grasp the POG and hold it snug against the front face upon placing the POG within the circumference of the rim, and
      a gripping member on the rear face for attaching the base to at least one spoke of a wheel,
   (b) placing a POG in the device within the circumference of the rim, with the rim firmly grasping the POG, and
   (c) attaching the device to the spoke using the gripping member.

5. The method of claim 4 where the POG holding device is made of a polymeric material and is formed by a molding process.

6. The method of claim 5 where the polymeric material is selected from the group consisting of polyethylene, polypropylene, acetal, and polycarbonate.

7. A method of displaying a POG on a spoke, including the step of
   (a) providing a device for holding a POG, including
      a disk-like, circular base,
      said base having a front face and a rear face, with the front face having a rim extending at least partially along the perimeter of the base which is adapted to grasp the POG and hold in snug against the front face upon placing the POG within the circumference of the rim, and
      a gripping member on the rear face for attaching the base to at least one spoke of a wheel,
   (b) attaching the device to the spoke using the gripping member and,
   (c) placing a POG in the device within the circumference of the rim, with the rim firmly grasping the POG.

* * * * *